(12) United States Patent
Yuan

(10) Patent No.: US 11,994,305 B2
(45) Date of Patent: May 28, 2024

(54) CEILING CASSETTE SMART COMBINED AIR CONDITIONER

(71) Applicant: Sichuan Hengya Electromechanical Installation Engineering Co., Ltd., Sichuan (CN)

(72) Inventor: Xiaoxiong Yuan, Sichuan (CN)

(*) Notice: Subject to any disclaimer, the term of this patent is extended or adjusted under 35 U.S.C. 154(b) by 0 days.

(21) Appl. No.: 17/982,756

(22) Filed: Nov. 8, 2022

(65) Prior Publication Data
US 2024/0003553 A1   Jan. 4, 2024

(30) Foreign Application Priority Data
Jul. 1, 2022  (CN) .......................... 202221701542.8

(51) Int. Cl.
F24F 1/029     (2019.01)
F24F 1/0317    (2019.01)
F24F 1/035     (2019.01)
F24F 1/037     (2019.01)
F24F 8/108     (2021.01)
F24F 8/22      (2021.01)

(52) U.S. Cl.
CPC .......... *F24F 1/029* (2019.02); *F24F 1/0317* (2019.02); *F24F 1/035* (2019.02); *F24F 1/037* (2019.02); *F24F 8/108* (2021.01); *F24F 8/22* (2021.01)

(58) Field of Classification Search
CPC .......... F24F 1/029; F24F 1/0317; F24F 1/035; F24F 1/037; F24F 8/108; F24F 8/22
USPC .......................................... 165/53
See application file for complete search history.

(56) References Cited

U.S. PATENT DOCUMENTS

| 5,761,908 A * | 6/1998 | Oas .......................... F24H 4/06 |
| | | 454/238 |
| 5,987,908 A * | 11/1999 | Wetzel .................... F24F 1/027 |
| | | 62/298 |
| 2022/0042692 A1* | 2/2022 | Bone-Winkel ............ A61L 2/18 |

* cited by examiner

Primary Examiner — Steve S Tanenbaum

(57) ABSTRACT

The invention discloses a ceiling cassette smart combined air conditioner, comprising a cassette body; the outer side of the front end of the cassette body is provided with an air outlet section; the cassette body is sequentially arranged and connected with a filter section, a disinfection and sterilization section, a freeze protection section, a surface cooling section, a reheat section, a humidification section, a fan section, a static pressure section and an air supply section according to the air circulation direction. The advantages of the invention: it is provided with integrated functions for detecting, displaying and controlling the indoor air quality, and can realize intelligent control and regulation of indoor air temperature, humidity, freshness, cleanliness, ultraviolet sterilization, negative oxygen ions, odor removal, formaldehyde removal and other multi-functional integration, meeting the most favorable effects of indoor health and comfort.

3 Claims, 1 Drawing Sheet

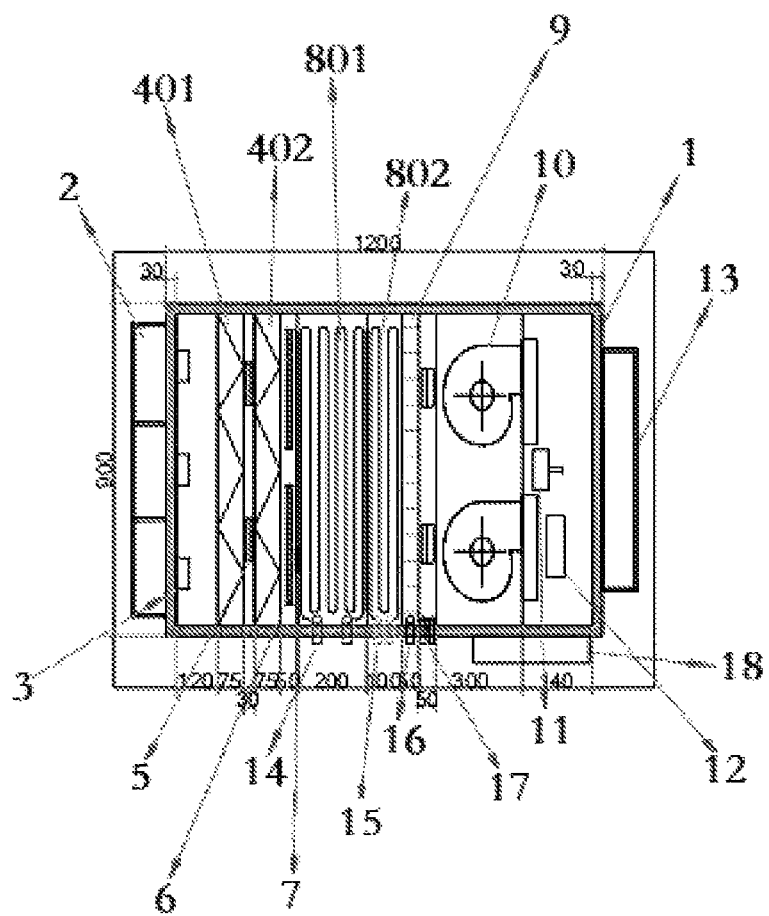

CEILING CASSETTE SMART COMBINED AIR CONDITIONER

TECHNICAL FIELD

The invention relates to the technical field of air conditioner, in particular to a ceiling cassette smart combined air conditioner.

BACKGROUND ART

With the consumption upgrade of air quality in household space, traditional household central air conditioners cannot meet the demands of high-quality home life. The traditional household air conditioners are either too cold or uneven overheating, which is hard to provide healthy and comfortable feelings. Additionally, the operation cannot take advantage of the natural factors to automatically switch to the energy-saving mode, resulting in high energy consumption. The household central air-conditioning systems on the market all work independently, e.g., air conditioners handle air temperature only, dehumidifiers handle air humidity, fresh fans handle fresh air and purification functions. These independent appliance systems cannot be integrated and coordinated, and because the outdoor temperature and humidity cleanliness changes greatly in the morning, middle and evening, the automatic variable work cannot be achieved. It is impossible to intelligently control various changing state parameters in a timely manner, and not possible to adapt to changes. Therefore, the most comfortable air environment can not be provided.

In view of this, a ceiling cassette smart combined air conditioner is proposed, which integrates the multi-functional centralized treatment of the indoor air quality, including air temperature, humidity, freshness, cleanliness, ultraviolet disinfection, negative oxygen ions, odor removal, and formaldehyde removal, etc. AI artificial intelligence control system is adopted to meet the indoor air conditioning effects of constant temperature, constant humidity, constant oxygen, constant pressure, constant quietness and constant cleanliness.

SUMMARY OF THE APPLICATION

Against the above existing problems, the invention provides a ceiling cassette smart combined air conditioner. The invention is realized through the following technical solution.

A ceiling cassette smart combined air conditioner, comprises a cassette body;

the outer side of the front end of the cassette body is provided with an air outlet section, comprising a fresh air outlet and a fresh air damper, a return air outlet and a return air damper, a stepping motor located on the inside of its front end and corresponding to the fresh air damper and the return air damper; the cassette body is sequentially arranged and connected with a filter section, a disinfection and sterilization section, a freeze protection section, a surface cooling section, a reheat section, a humidification section, a fan section, a static pressure section and an air supply section according to the air circulation direction; the filter section sequentially includes a primary filter and a high-efficiency filter; fresh air and return air temperature and humidity module is arranged between the primary filter and the high-efficiency filter; the disinfection and sterilization section comprises ultraviolet lamps; the surface cooling section sequentially comprises ten rows of counter-flow surface coolers and three rows of cross-flow surface coolers; the humidification section comprises a humidification module; the fan section comprises two brushless DC fans arranged up and down, and an air supply temperature and humidity module is provided after the upper and lower brushless DC fans; the static pressure section comprises a negative ion generator; the air supply section comprises an air supply port;

the outer side of the cassette body is also provided with a filter screen access panel, an air conditioning water supply and return valve, a reheating water valve, a pure soft water valve of humidification module, a lift pump and natural flow condensate water port, and an electrical control box.

Furthermore, the number of the fresh air outlet and the fresh air damper are one, and the number of the return air outlet and the return air damper are two.

Furthermore, the air conditioning water supply and return valve is DN25, the reheating water valve is DN20, the pure soft water valve of humidification module is DN20, the lift pump and natural flow condensate water port is DN15.

The advantages of the invention: the invention is a smart combined air conditioning cassette, provided with detection functions for processing indoor air $PM_{2.5}$, $CO_2$, temperature, humidity, formaldehyde, TVOC, etc., display functions, control functions, and wireless Wi-Fi connectivity. The control operations and display functions of the combined air conditioning cassette can be remotely managed through the mobile APP or WeChat public service account. It can realize intelligent control and regulation of indoor air temperature, humidity, freshness, cleanliness, ultraviolet sterilization, negative oxygen ions, odor removal, formaldehyde removal and other multi-functional integration, meeting the most favorable effects of indoor health and comfort.

BRIEF DESCRIPTION OF ACCOMPANY DRAWINGS

FIG. 1 is a schematic diagram of a ceiling cassette smart combined air conditioner of the invention.

SPECIFIC EMBODIMENT OF THE APPLICATION

The technical solutions of the invention are further described clearly and completely with reference to the accompanying drawings.

Embodiment 1, a ceiling cassette smart combined air conditioner, comprises a cassette body 1;

the outer side of the front end of the cassette body 1 is provided with an air outlet section 2, including a fresh air outlet and a fresh air damper, a return air outlet and a return air damper, a stepping motor 3 located on the inside of its front end and corresponding to the fresh air damper and the return air damper; the cassette body 1 is sequentially arranged and connected with a filter section, a disinfection and sterilization section, a freeze protection section 7, a surface cooling section, a reheat section, a humidification section, a fan section, a static pressure section and an air supply section according to the air circulation direction;

the filter section sequentially comprises a primary filter 401 and a high-efficiency filter 402; a fresh air and return air temperature and humidity module 5 is arranged between the primary filter 401 and the high-efficiency filter 402;

the disinfection and sterilization section comprises ultraviolet lamps 6;

the surface cooling section sequentially comprises ten rows of counter-flow surface coolers 801 and three rows of cross-flow surface coolers 802;

the humidification section comprises a humidification module 9;

the fan section comprises two brushless DC fans 10 arranged up and down, and an air supply temperature and humidity module 11 is provided after the upper and lower brushless DC fans 10;

the static pressure section comprises a negative ion generator 12;

the air supply section comprises an air supply port 13;

the outer side of the cassette body is also provided with a filter screen access panel, an air conditioning water supply and return valve 14, a reheating water valve 15, a pure soft water valve of humidification module 16, a lift pump and natural flow condensate water port 17, and an electrical control box 18. The air conditioning water supply and return valve 14 is DN25, the reheating water valve 15 is DN20, the pure soft water valve of humidification module 16 is DN20, the lift pump and natural flow condensate water port is DN15.

The working principle of the multi-functional smart combined air conditioning cassette, according to the working order from the outside to the inside of the machine.

1. Air outlet section: Arrange one fresh air outlet and fresh air damper, two return air outlets and return air dampers; the stepping motor can automatically adjust the required fresh air damper and return air damper (i.e. the volume control of fresh air and return air).

Control of the fresh air outlet and damper, return air outlet and damper: The indoor controller automatically controls the opening of the fresh air damper of the smart combined air conditioning cassette according to the detection concentration of indoor $CO_2$, and the opening determines the entering amount of fresh air. The opening of the indoor return air damper is automatically adjusted to determine the amount of the return air, and the control methods of the fresh air damper and the return air damper are inversely proportional. According to the indoor air $CO_2$ detection parameters, different control command is issued, which can automatically realize various fresh-return air demands such as partial fresh air + partial return air, full fresh air, full return air, etc. According to the indoor air $PM_{2.5}$ detection parameters, instructions are sent out to control the fan speed to achieve the speed and efficiency requirements of filtering indoor and outdoor $PM_{2.5}$.

2. Mixing bellows: The function is to mix and equalize the flow of fresh air and return air. It is equipped with fresh air and return air temperature and humidity module controllers, and can also be equipped with aromatherapy devices to provide the room with a suitable fragrant atmosphere.

3. The filter section and sterilization section: The required fresh air and return air enter the mixed air section of the smart combined air conditioning cassette respectively, and then pass through the primary filter for primary filtering. After primary filtration, use ultraviolet light combined with photocatalyst filter for disinfection and sterilization (can be shut down); the sterilized air is then finely filtered through a high-efficiency filter (to remove $PM_{2.5}$\$PM_{1.0}$\peculiar smell).

4. The surface cooling section, the reheat section, the humidification section: after the air is processed fresh and clean, it enters the surface cooling section of the air conditioner (i.e. cooling or heating air), direct cooling (coupled dehumidification) in summer, direct heating in winter. In transitional seasons, there is no need to turn on the outdoor unit of the air conditioner, and the fresh air can be directly filtered and sent into the room. When the humidity of the air needs to be processed, first use the chilled water to dehumidify, then heat and return the cold and dry air through the reheat section and send out the dry air of room temperature, which can realize the isothermal dehumidification function. Due to the low humidity of indoor and outdoor air in winter (referring to absolute humidity—air moisture content), humidification is required. If the relative humidity is less than 30% at the suitable temperature (18° C.-22° C.). in the detection room, the water valve of the humidification module can be automatically opened for enthalpy increase or equal enthalpy humidification air treatment. This ensures that the indoor humidity is controlled between 40%-60% at a suitable temperature, which meets the indoor temperature and humidity requirements for health and comfort in winter.

5. Ventilation function: When in the transition seasons, due to the large temperature difference between indoor and outdoor, we can take advantage of the natural temperature to deal with the indoor air temperature, that is, the full fresh air mode. Input a large amount of fresh air with a suitable temperature into the room to deal with the hot and humid air or the cold air in the room for free. This is using nature's free energy to deal with indoor temperature and humidity and health and comfort needs.

6. Indoor temperature and humidity control: The temperature and humidity parameters set by the indoor controller are compared with the temperature and humidity parameters detected at two places (indoor controller, and the return air outlet of the combined air conditioning cassette), and then the output signal is calculated and sent to the cold and hot water control actuator of the combined air conditioning cassette (i.e. integral proportional control valve). Control the opening of the integral proportional control valve to control the water flow, thereby the air temperature is managed (i.e. VWV control system). As the combined air conditioning cassette heats up or cools down the room closer to the set target temperature, the temperature difference of the supply air becomes smaller and smaller, and the human body will feel increasingly comfortable. Additionally, because the workload of the unit is reduced, it is more energy-saving. This is the smart operation way of adapting to changes.

7. Variable air volume fan: Two sets of DC brushless fans can automatically adjust the wind speed and air volume. When the controller detects that the indoor cooling and heating requires a large load, or the $CO_2$ concentration is too high and requires a large volume of fresh air, or the $PM_{2.5}$ content is high, the controller outputs signals instructing the fans to automatically increase the speed and the air volume; otherwise, the fans automatically reduce the speed and the air volume; (i.e. VAV control system). This is a measure of saving energy as well as reducing noise, killing two birds with one stone.

8. Negative ion generator: A negative ion generator (which can be turned off) is set at the air outlet to increase the negative ions in the indoor air, ensuring smooth breathing and better sleep or rest.

In a word, the multi-functional smart combined air conditioning cassette can perform I/O automatic control according to the detection and setting of $PM_{2.5}$, $CO_2$, temperature, humidity, formaldehyde, TVOC, etc. The all-variable design ideas that vary from person to person, adapt to local conditions and time can be realized, which are energy-saving as well as healthy and comfortable, achieving the ideal healthy, comfortable and energy-efficient indoor environment for the human body.

In the description of the specification, description with reference to the terms "one embodiment," "some embodiments," "example," "specific example," or "some examples", etc., mean specific features described in connection with the embodiment or example, structure, material or feature is included in at least one embodiment or example of the invention. In the specification, schematic representations of the above terms do not necessarily refer to the same embodiment or example. Furthermore, the particular features, structures, materials or characteristics described may be combined in any suitable manner in any one or more embodiments or examples.

The above are only the preferred embodiments of the invention, and are not intended to limit the invention. Any modifications, equivalent replacements and improvements made within the spirit and principles of the invention shall fall within the scope of protection of this invention.

What is claimed is:

1. A ceiling cassette smart combined air conditioner, comprising a cassette body;
    an outer side of a front end of the cassette body is provided with an air outlet section, comprising a fresh air outlet and a fresh air damper, a return air outlet and a return air damper, a stepping motor located on the inside of its front end and corresponding to the fresh air damper and the return air damper; the cassette body is sequentially arranged and connected with a filter section, a disinfection and sterilization section, a surface cooling section, a humidification section, a fan section, a static pressure section and an air supply section according to the air circulation direction; the filter section sequentially includes a primary filter and a filter; a fresh air and return air temperature and humidity module is arranged between the primary filter and the filter; the disinfection and sterilization section comprises ultraviolet lamps; the surface cooling section sequentially comprises ten rows of counter-flow surface coolers and three rows of cross-flow surface coolers; the humidification section comprises a humidifier; the fan section comprises two brushless DC fans arranged up and down, and an air supply temperature and humidity module is provided after the upper and lower brushless DC fans; the static pressure section comprises a negative ion generator; the air supply section comprises an air supply port;
    the outer side of the cassette body is also provided with a filter screen access panel, an air conditioning water supply and return valve, a reheating water valve, a pure soft water valve of a humidifier, a lift pump and natural flow condensate water port, and an electrical control box.

2. The ceiling cassette smart combined air conditioner according to claim 1, wherein there is one fresh air outlet one fresh air damper; two return air outlets; and two return air dampers.

3. The ceiling cassette smart combined air conditioner according to claim 1, wherein the air conditioning water supply and return valve is DN25, the reheating water valve is DN20, the pure soft water valve of a humidifier is DN20, the lift pump and natural flow condensate water port is DN15.

* * * * *